United States Patent [19]

Borskey

[11] Patent Number: 5,078,441
[45] Date of Patent: Jan. 7, 1992

[54] VEHICLE WITH RETRACTABLE AND EXTENSIBLE ROOF ASSEMBLY

[75] Inventor: Charles L. Borskey, Austin, Tex.

[73] Assignee: Sportsmobile Texas, Inc., Austin, Tex.

[21] Appl. No.: 588,065

[22] Filed: Sep. 25, 1990

[51] Int. Cl.⁵ .................................................. B62C 1/06
[52] U.S. Cl. .................................. 296/26; 296/165; 292/DIG. 72
[58] Field of Search ............... 296/160, 164, 165, 176, 296/172, 173, 26; 292/DIG. 72

[56] References Cited

U.S. PATENT DOCUMENTS

| | | | |
|---|---|---|---|
| 545,277 | 8/1895 | Feinberg | 292/DIG. 72 X |
| 2,714,524 | 8/1955 | Swiggum | 296/173 |
| 2,843,418 | 7/1958 | Gray | 296/173 |
| 3,582,130 | 6/1971 | Borskey | 296/176 |
| 3,619,001 | 11/1971 | Borskey | 296/176 |
| 3,770,314 | 11/1973 | Borskey | 296/176 |
| 3,894,765 | 7/1975 | Bourke et al. | 296/160 |
| 4,362,258 | 12/1982 | French | 296/160 X |

FOREIGN PATENT DOCUMENTS 1567897 5/1980 United Kingdom .................. 296/26

Primary Examiner—Johnny D. Cherry
Assistant Examiner—Gary C. Hoge
Attorney, Agent, or Firm—Marshall & Melhorn

[57] ABSTRACT

A vehicle with a retractable and extensible roof assembly including a ceiling for the vehicle having an opening formed at one end thereof, a load-supporting horizontally slidable closure member adapted to cover the opening in the ceiling, a vertically movable roof portion over the ceiling, movable between a fully extended portion and a retractable portion having flexible sidewalls between the movable roof portion and the ceiling, and utilizing both tension and compression spring biasing for aiding in the elevation of the roof to the fully extended position, and the lowering of the roof to the fully retracted position thereof.

9 Claims, 4 Drawing Sheets

VEHICLE WITH RETRACTABLE AND EXTENSIBLE ROOF ASSEMBLY

BACKGROUND OF THE INVENTION

In recent years small buses and vans have been used by families and small groups, in traveling from one part of the country to another, using the vehicle for living quarters at night and during stopovers at vacation and recreation places. In most cases, small buses and vans are not of a sufficient height to permit an adult to stand erect or to move comfortably from place to place in the vehicle, and, as a result, various attempts have been made to make extensible roofs for these vehicles Existing extensible roof designs have to some extent been unsatisfactory in that difficulty has been experienced in extending and retracting the associated roofs. Further, considerable physical exertion has been necessary to raise or lower the roofs to the fully extended or retracted position. Consequently, these designs have a propensity to drop rather abruptly when lowering, as well as a relative difficulty encountered in elevating the same to a fully extended position As a result, several designs have attempted to facilitate and improve upon the extending and retracting operation.

As an example, U.S. Pat. No. 3,770,314 to Charles L. Borskey discloses an extensible roof assembly utilizing one tension spring to assist in the operations of extending and retracting the roof.

U.S. Pat. No. 3,619,001 to Charles L. Borskey teaches an extensible roof assembly utilizing several tension springs to assist in the elevation of the roof to its fully extended position.

U.S. Pat. No. 3,582,130 to Charles L. Borskey relates to an extensible roof assembly utilizing one tension spring to assist with the operations of extending and lowering the roof.

U.S. Pat. No. 3,212,813 to William L. Peterson et al discloses an extensible roof assembly employing a tension spring device to assist with the elevation of the roof assembly.

U.S. Pat. No. 2,843,418 to Charles W. Gray relates to an expandable camping trailer employing a helical tension spring to counterbalance the weight of the cover.

U.S. Pat. No. 2,729,497 to Arleigh A. Runyan teaches a collapsible camping trailer body utilizing a gear shifting mechanism that may be operably connected with rotatable screw shafts to facilitate raising of the roof.

SUMMARY OF THE INVENTION

It is one object of the present invention to provide an extensible roof for a vehicle which can easily be raised to a fully extended position, and in addition, slowly and easily lowered to a fully retracted position, without requiring substantial physical effort.

It is a further object of the invention to provide an extensible and retractable roof for a vehicle which can be readily installed on a conventional vehicle.

Another object of the invention is to provide an extensible roof for a vehicle which encloses substantially all of the principal moving parts within the top thereof, and which effectively seals itself in a folded position to prevent water, dirt grit and other foreign materials from entering the extensible roof portion of the vehicle.

Still another object of the invention is to provide a compact, relatively simple vehicle extensible roof structure which, when in a folded position, increases the height of the vehicle very little and is compatible with the lines and design of the overall vehicle and which, when in the extended position, can be installed without substantially weakening or altering the structure of the original vehicle top A further object of the invention is to provide an extensible roof structure of the aforementioned type which provides adequate room in the vehicle for an adult individual to stand erect and sufficient height in the vehicle to enable the space to be used for storage or as sleeping space when it is in its extended position.

Another object of the invention is to provide an extensible roof which can be fully manufactured apart from the vehicle and shipped stored and installed without the use of any special tools, equipment, or special skill, and which can be readily constructed using standard, readily available materials.

Another object of the invention is to provide a vehicle having an extensible roof structure which includes a horizontally slidable and hinged closure member which is adapted to selectively close the opening in the vehicle ceiling and provide support for various lengths of mattresses for sleeping purposes when not in use.

BRIEF DESCRIPTION OF THE DRAWINGS

Other objects and advantages of the invention will become readily apparent to those skilled in the art from reading the following detailed description of an embodiment of the invention when considered in the light of the accompanying drawings in which.

DETAILED DESCRIPTION OF THE PREFERRED EMBODIMENT

Figure 1:
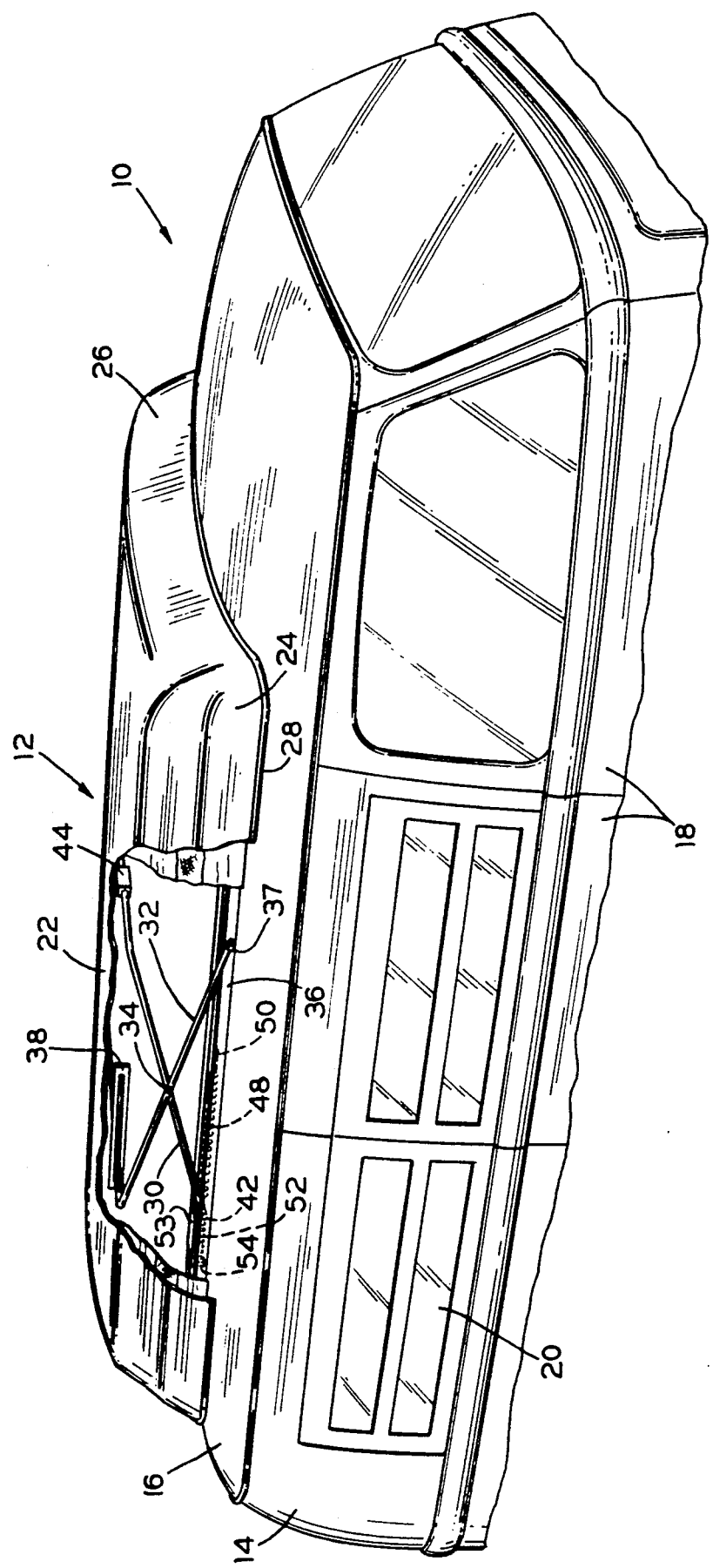
FIG. 1 is a fragmentary perspective view of a vehicle showing the retractable and extensible roof assembly of the invention in a retracted position.
Figure 2:
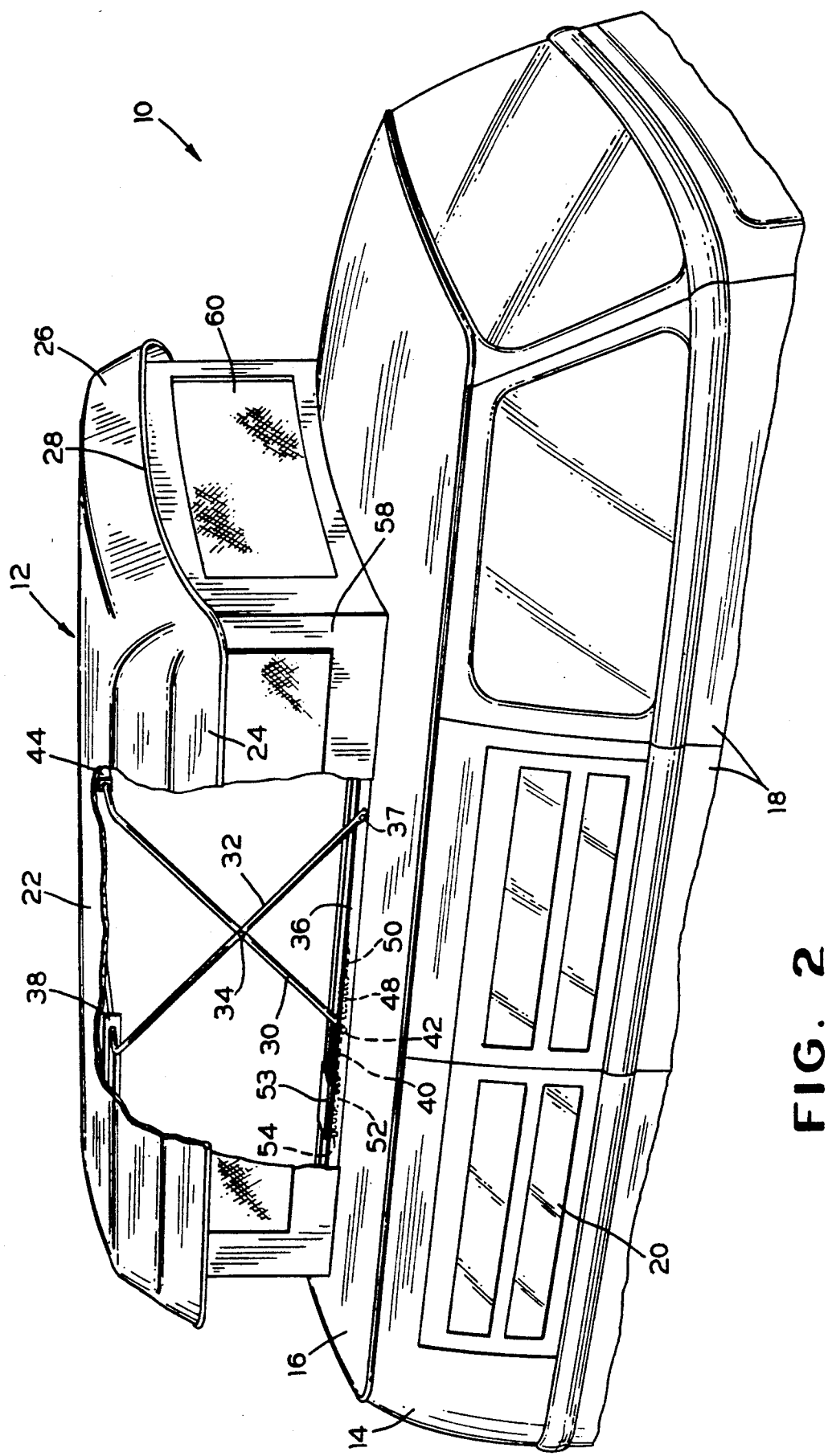
FIG. 2 is a fragmentary perspective view similar to FIG. 1 showing the roof assembly in the extended position.

Referring to the drawings and to FIGS. 1 and 2, in particular, there is shown a vehicle, generally designated by reference numeral 10, on which the present roof 12 is mounted. The vehicle illustrated in the drawings is a small bus or van which does not have sufficient height between the floor and the ceiling for an adult to stand erect therein The roof 12 is typically formed of a fiber glass reinforced plastic or similar material which is light in weight, sturdy in construction, resistant to weather, and easy to maintain. The contour of the roof 12, when it is in the retracted or lower position, as illustrated in FIG. 1, presents a low silhouette which is pleasing in appearance and is of acceptable aerodynamic configuration The type of vehicle on which the roof installation is made is not considered critical so long as the vehicle top construction is such that the present retractable and extensible roof can be mounted thereon. However, it should be noted that the roof of the present invention is particularly adapted to small vehicles which require additional head room for passengers or occupants. These vehicles generally include a body portion 14, a ceiling portion 16, doors 18, a plurality of windows 20, and front and rear ground-engaging wheels not shown.

The retractable and extensible roof 12 consists of a top panel 22, side panels 24, and end panels 26. At the free marginal edges of the side and end panels 24 and 26, respectively, there is provided a molding strip 28 typically formed of an elastomeric material such as rubber, for example, which will effectively create a cushioned seal between the roof 12 and the ceiling portion 16 of the vehicle 10. It will be appreciated that in the retracted position illustrated in FIG. 1, the strip 28 effectively militates against the passage of water, dirt, grit, and other foreign materials into the interior of the vehicle 10 through the top 12. In order to assist with the raising of the roof 12 from the retracted position of FIG. 1 to the extended position of FIG. 2, there is provided a mechanism which includes a pair of crossarms 30 and 32 which are pivotally interconnected as at 34. The crossarms 30 and 32 are formed as U-shaped members so that the relationship to each crossarm on one side of the vehicle 10 is the same as the relationship on the other side of the vehicle.

Figure 6:
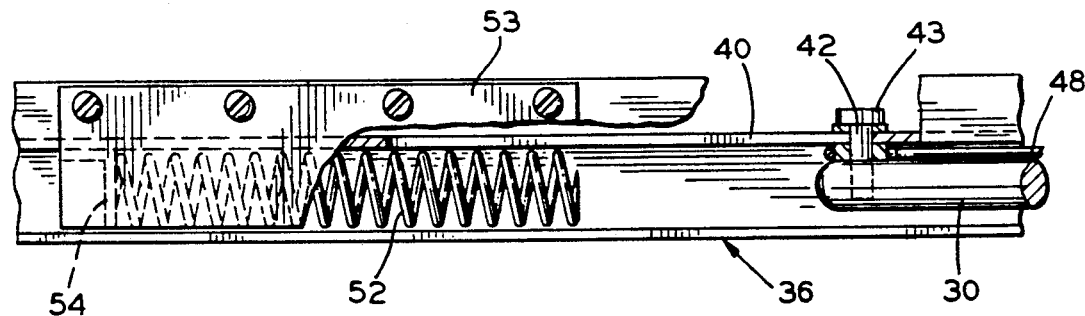
FIG. 6 is an enlarged fragmentary top plan view of the helical compression spring illustrated in FIG. 5.

Because the relationship of each component on one side of the vehicle 10 is substantially identical to like components on the other side of the vehicle 10, it is only necessary that one side of the vehicle 10 be discussed in the preferred embodiment and shown in the illustrated drawings. The lower end of crossarm 32 is pivotally connected to the channel member 36 at 37 while the center of the crossarm 32 is free to slide forward and backward in a pair of guides 38 mounted on the underside of roof 12. The channel members 36 are fixedly attached to the ceiling portion 16 of the vehicle 10. The lower end of the crossarm 30 is slidably engaged in a slot 40 of the channel member 36 by a stud 42. As can be seen in FIG. 6, the stud 42 includes an enlarged head portion 43 and extends through the slot 40 where it attaches to the lower end of crossarm 30. As illustrated in FIGS. 1 and 2, the center of the crossarm 30 passes through a pivot and anchor block 44 which is mounted on the underside of the roof 12. Thus, as the end of the crossarm 30 slides forward and backward in the slot 40, the center of the crossarm pivots in the anchor block 44. At the lower end of the crossarm 30, on the side corresponding to the front of the vehicle, a helical tension spring 48, which operates in tension, has one end thereof secured to the end of the crossarm 30 and the opposite end secured to a turnbuckle 50 which is fastened to the channel member 36. A corresponding helical tension spring 48 and turnbuckle 50 are attached to the opposite end of the crossarm 30 on the opposite side of the vehicle. The turnbuckle 50 is used to adjust the spring tension to the desired level.

Figure 5:
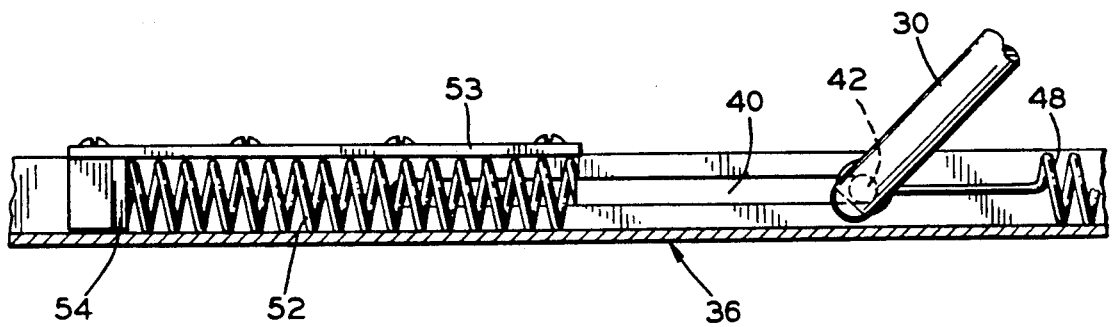
FIG. 5 is an enlarged fragmentary side elevational view showing the helical compression spring illustrated in FIGS. 1, 2, and 3.

As shown in FIGS. 1, 2, 3, 5, and 6, a helical compression spring 52 is utilized which operates under compression. Similarly, a corresponding helical compression spring 52 is utilized on the opposite side of the vehicle. FIGS. 5 and 6 show the compression helical spring 52 as it relates to the extensible roof 12 when the extensible roof is in its fully extended position. The compression helical spring 52 is retained within the channel member 36 by a cover plate 53 typically maintained in fixed relation by means of threaded fasteners. When the roof 12 is situated in or relatively near to its retracted position, one end of the helical compression spring 52 engages the crossarm 30 while the other end of the helical compression spring 52 is retained by a stop plate 54, which is attached to the channel member 36. As the crossarm 30 moves backward in slot 40 towards the helical compression spring, the compression spring 52 will be compressed between the crossarm 30 and the stop plate 54, thereby increasing the amount of potential energy stored by the compression spring 52.

Consequently, when the roof 12 is in the retracted position as shown in FIG. 1, the tension spring 48 is in tension and the compression spring 52 is in compression. Therefore, when the roof 12 is in the retracted position, both the tension spring 48 and the compression spring 52 are storing potential energy. During the elevation of the roof 12, the potential energy is converted to kinetic energy, which is utilized to assist in elevating the roof 12 to its fully extended position, as illustrated in FIG. 2. Upon initiating the process to elevate the roof 12, the two springs 48 and 52 work in conjunction with one another to impart a relatively strong initial force upon the crossarms 30 and 32 to quickly initiate the upward movement of the roof 12 towards its fully extended position. The helical compression spring 52 converts the potential energy to kinetic energy while the roof 12 is being elevated in the initial upward movement thereof. After the roof 12 has been elevated approximately twelve inches, the compression spring 52 ceases to make contact with the crossarm 30. Consequently, the helical tension spring 48 effectively supplies all of the kinetic energy exerted for the remainder of the elevation process, and as a result the roof 12 is elevated to the fully extended position. Once the roof 12 is in the fully extended position, the bias of the respective helical tension spring 48 is sufficient to maintain the roof 12 in place.

In a fashion similar to the extension process explained above, the tension spring means 48 and the compression spring means 52 function together to assist in the lowering of the roof 12 to the fully retracted position, as illustrated in FIG. 1. Consequently, the roof 12 will lower more slowly and softly into the fully retracted position than possible with previous designs of extensible roof assemblies.

Figure 7:
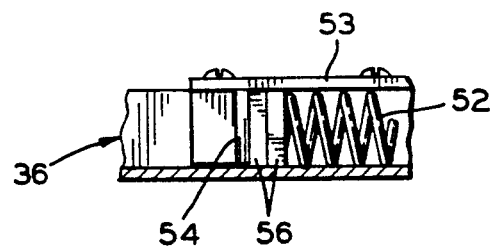
FIG. 7 is a fragmentary side elevational view of the helical compression spring illustrated in FIGS. 5 and 6, showing the utilization of spacer elements.

As shown in FIG. 7, spacers 56 may be utilized between the stop plate 54 and compression spring 52 to adjust the spring compression to a desired level, either to cause extension of the roof to be more easily accomplished, or to aid in balancing the roof. Alternatively, the compression helical spring means 52 could be replaced by other means to assist with the elevating and lowering of the roof, such as a lead screw device, hydraulic means, or the like.

As illustrated in FIG. 2, when the roof 12 is in the extended position, the side and end flaps 58 and 60 are unfolded and effectively enclose the space between the undersurface of the roof 12 and the upper surface of the ceiling 16 of the vehicle 10. The side and end flaps 58 and 60 are comprised of flexible water repellant material such as canvas, for example, having openings therein covered by a flexible screening material to permit the transmission of both air and light therethrough. The upper marginal edges of the side and end flaps 58 and 60 are typically secured to the inner surface of the roof 12 and the lower edges are suitably secured to the upper surface of the ceiling 16 of the vehicle 10.

Thereby, when the roof 12 is lowered to its retracted position, the flexible material of the side and end flaps 58 and 60 fold to a concealed position under the roof 12.

Figure 3:
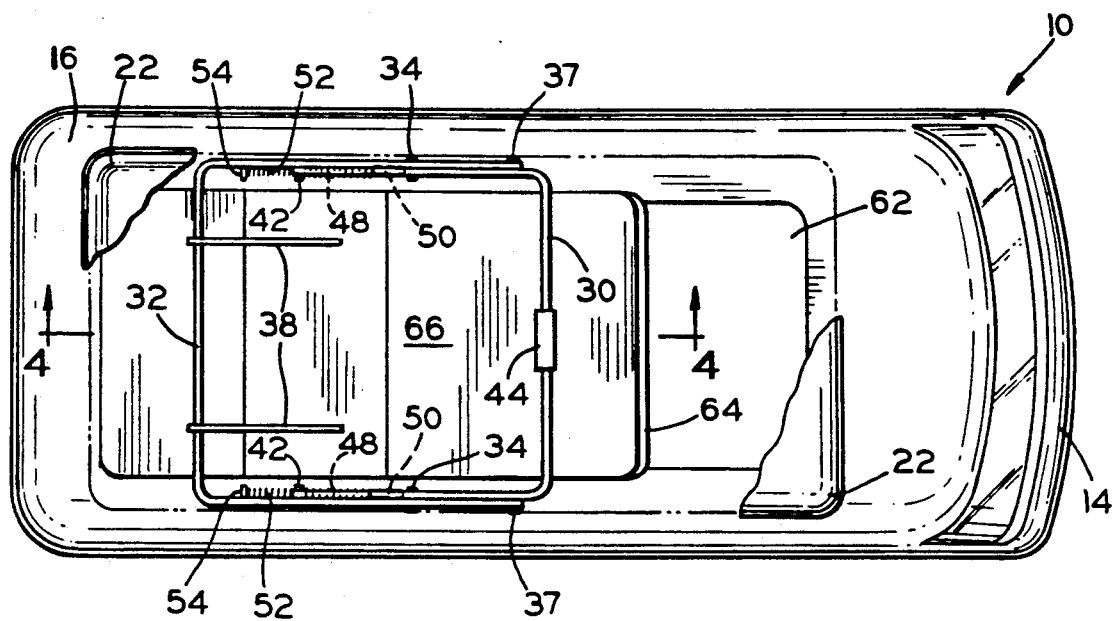
FIG. 3 is a top plan view of the invention illustrated in FIGS. 1 and 2 partially cut away to more clearly illustrate the structure.
Figure 4:
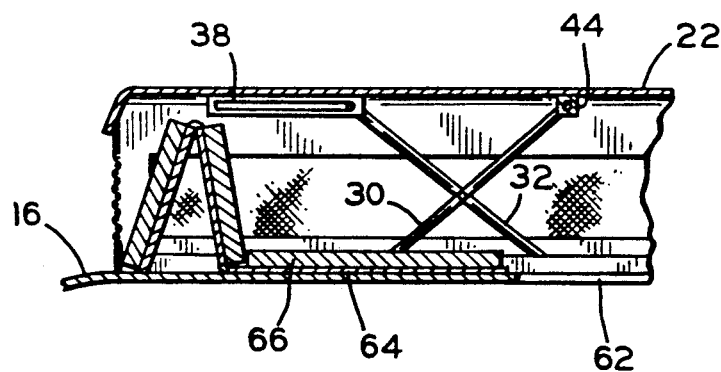
FIG. 4 is a fragmentary elevational sectional view taken along line 4—4 of FIG. 3.

With reference to FIGS. 3 and 4, there is shown an opening 62 formed in the ceiling portion 16 of the vehicle 10 completely covered by the roof 12. The opening 60 is typically formed in the ceiling of the vehicle 10 after manufacture thereof, and at a location remote from where the vehicle was manufactured. The opening 62 provides access from the interior of the vehicle 10 into the space encompassed by the roof 12 and the side and end flaps 58 and 60, respectively, when the roof 12 is in the extended position of FIG. 2. It is through the opening 62 that occupants or passengers of the vehicle 10 may extend the upper portions of their body to obtain full head room in the vehicle to assume an erect position.

Partially covering opening 62 is a slidably disposed mattress support panel 64 comprising three sections connected by hinges. The panel 64 is adapted to be supported on the upper surface of the ceiling portion 16 of the vehicle 10 within the zone defined by the side flaps 58 and the end flaps 60 and is further employed to support a mattress 66 (shown in folded position of non-use in FIG. 4). When the panel 64 is in the unfolded position illustrated in FIG. 3, the space there above would typically have a composite length adequate to house and support adults. When not in use, the panel 64 and the mattress 66 are folded as shown in FIG. 4 to a storage position such that the uncovered portion of opening 62 is effectively increased.

The extensible roof 12 is typically installed on a conventional small bus type vehicle by cutting an aperture or hole in the ceiling portion of the vehicle of the desired size. The marginal edges of the formed aperture may then be covered by appropriate molding strips to provide a finished appearance thereto. When the channel members 36 are secured in place it will be understood that the crossarms 30 and 32 are simultaneously positioned. It will be apparent that the installation is made by the utilization of conventional fastener means such as screws, or nuts and bolts, and that no special tools are required. After the extensible roof structure has been installed on the vehicle 10, the roof 12 can be conveniently extended from the inside of the vehicle by merely pushing upward at the center of crossarm 30 on pivot and anchor block 44. Normally, when the roof 12 is in its retracted position, the side and end flaps 58 and 60 are in a folded position. As the roof 12 elevates, the side and end flaps 58 and 60 are brought under some tension until they are completely unfolded. The roof 12 may be retracted by manually grasping the center of crossarm 30 at pivot and anchor block 44 and pulling down As the roof 12 is retracting, the side and end panels 52 and 54 are folded to be completely concealed within the interior of the roof 12 in a protected position.

It will be appreciated from the foregoing that the assembly illustrated and described has produced a relatively simple means for raising and lowering the retractable and extensible roof from only a single location.

A particular advantage of the assembly resides in the requirement for only a single latching or locking mechanism in the region of the front end panel 26 of roof 12 to lock the same, in its lowered position, to the vehicle 10. The linkage mechanism is such that when the front panel is suitably locked, the rear end of the roof, although not specifically locked, cannot be raised. Another particular advantage of the assembly is that very little physical effort is needed to move the roof 12 from its retracted position, to its fully extended position, or vice versa.

The description has pointed out the structural and functional aspects of the crossarm 30 for purposes of roof support and its use in the raising and lowering of the roof, but it must also be realized that the crossarm 30 provides a member which may be grasped to effectively manipulate the assembly.

In accordance with the provisions of the patent statutes, I have explained the principle and mode of operation of my invention and have illustrated and described what I now consider to represent its best embodiment. However, it is to be understood that within the spirit and scope of the appended claims the invention may be practiced otherwise than as specifically illustrated and described.

What is claimed is:

1. A vehicle having a passenger compartment and a retractable roof assembly including a ceiling structure for the vehicle having an aperture formed therein providing communication with the passenger compartment of the vehicle, and a roof disposed in superimposed relation over the ceiling structure and covering the aperture in the ceiling structure, the improvement comprising:

means for extending and retracting the roof assembly, said means including at least a first and second support member attached to both the ceiling structure and the roof assembly;

means for pivotally interconnecting the first and second support members;

a first biassing means connected to the first support member to assist in the extension of the roof assembly; and a second biassing means for providing a compressive force first to the support member to assist in the extension of the roof assembly.

2. The invention defined in claim 1 wherein said second biassing means includes a spring means.

3. The invention defined in claim 2 wherein said first and second support members consist of a first and second U-shaped member, each U-shaped member having two distal ends and a central section.

4. The invention defined in claim 3 including means for attaching the distal ends of the first and second U-shaped members to the ceiling structure adjacent to the aperture, and means for attaching the first and second U-shaped members to the roof assembly.

5. The invention defined in claim 4 wherein said means for attaching the distal ends of the first and second U-shaped members to the ceiling structure provides for relative movement there between.

6. The invention defined in claim 4 wherein said means for attaching the distal ends of said first and second U-shaped members includes a channel member of generally U-shaped cross-section.

7. The invention defined in claim 2 including a channel member containing said spring means.

8. The invention defined in claim 7 including means for adjusting the compression of said spring means.

9. The invention defined in claim 8 wherein said means for adjusting the compression of the spring means includes a spacer means.

* * * * *